UNITED STATES PATENT OFFICE.

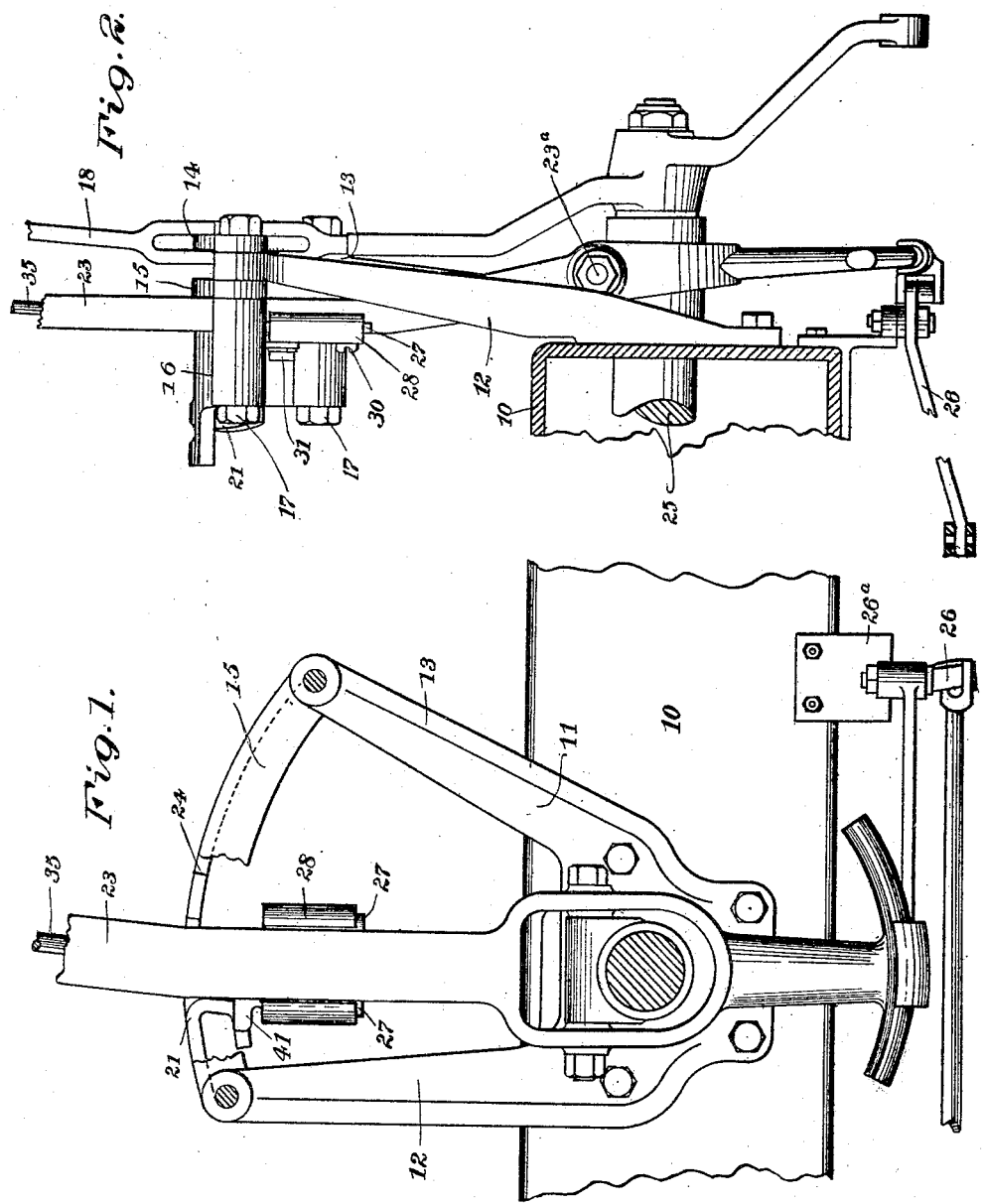

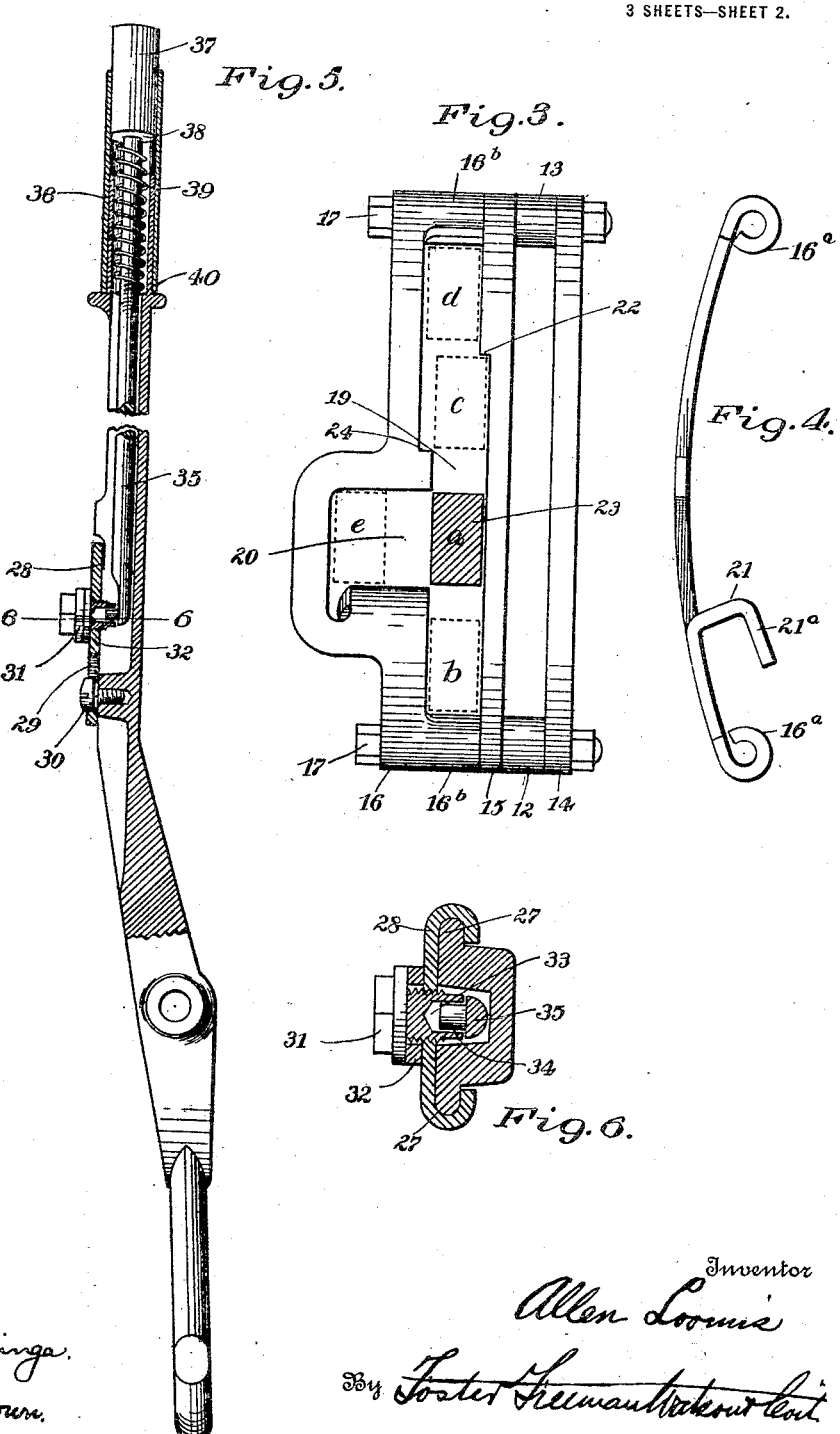

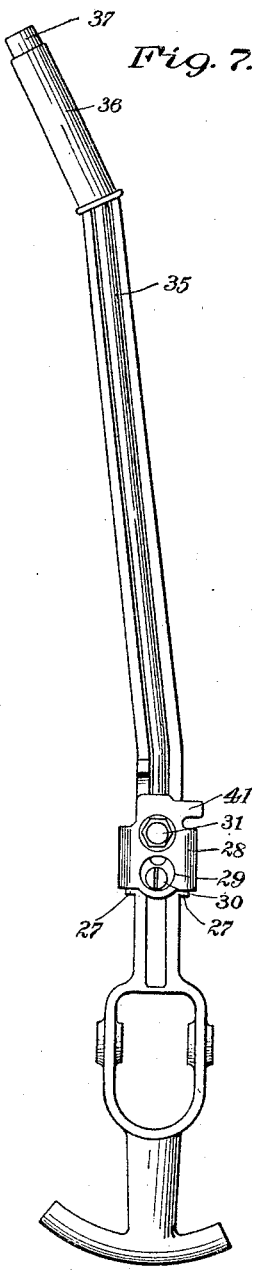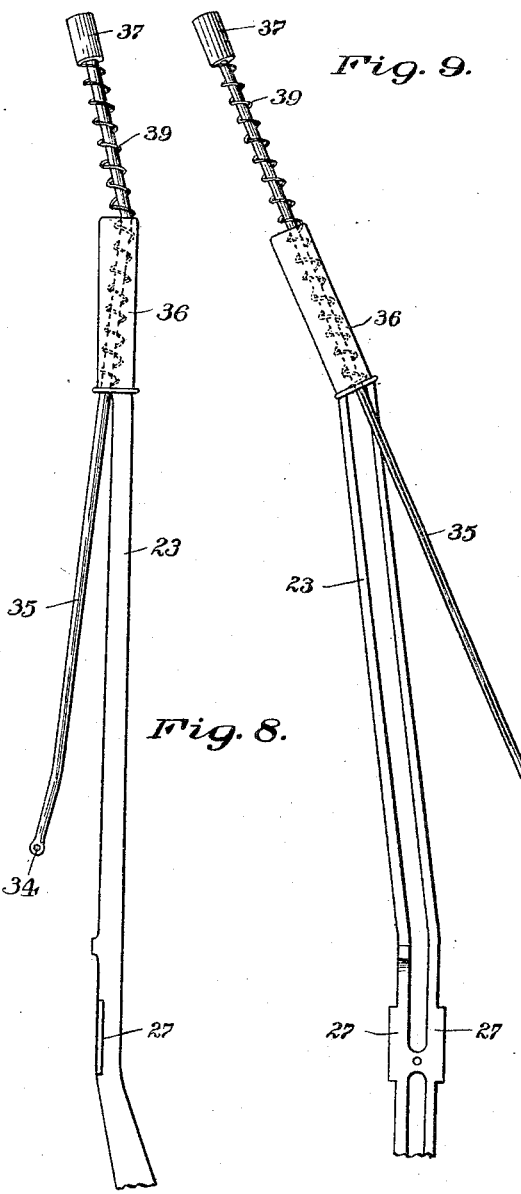

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

CONTROLLING MECHANISM FOR MOTOR-VEHICLES.

1,205,908.  Specification of Letters Patent. Patented Nov. 21, 1916.

Application filed August 3, 1910. Serial No. 575,356.

*To all whom it may concern:*

Be it known that I, ALLEN LOOMIS, a citizen of the United States, and resident of Detroit, Wayne county, State of Michigan, have invented certain new and useful Improvements in Controlling Mechanism for Motor-Vehicles, of which the following is a specification.

This invention relates to controlling mechanism for motor vehicles, and particularly to that type in which the speed is controlled by a single controlling lever, which moves backward and forward along a guide for forward speeds, and transversely for reversing. Such a controlling mechanism is shown and described in the patent to Russell Huff No. 1,122,118, granted December 22, 1914.

The objects of this invention are to improve the above type of controlling mechanism, so as to simplify and cheapen its construction and render its operation more efficient.

The invention will be described in connection with the accompanying drawings, in which—

Figure 1 is a side elevation partly in section showing the controlling lever and contiguous parts of a motor vehicle; Fig. 2 is a transverse section through one of the side members of the motor vehicle showing the controlling mechanism in elevation; Fig. 3 is a plan view of the guide member showing the controlling lever in section; Fig. 4 is a detail of one of the side members for the guide; Fig. 5 is a longitudinal section of the controlling lever; Fig. 6 is a section on the line 6—6, Fig. 5; Fig. 7 is a side elevation of the controlling lever removed from its pivot; Fig. 8 is an edge view; and Fig. 9 is a side view of a portion of the controlling lever illustrating the method of withdrawing the latch rod therefrom.

Referring to the accompanying drawings, 10 designates a side bar or member of a motor vehicle to which is bolted a bracket 11, provided with separated and upwardly extending arms 12 and 13. A series of side members or guide pieces 14, 15 and 16 are secured to the arms 12 and 13, so as to form a plurality of guides. The side member 16 is formed of sheet metal and the ends are bent or curled over as shown at 16ª in Fig. 4, so as to form eyes which are adapted to receive a pair of bolts 17. The side members are secured together and to the arms 12 and 13 by means of the bolts which pass therethrough and through the arms, the arms themselves forming separators or spacing blocks between the side members 14 and 15, and the side member 16 being provided with laterally extending portions 16ᵇ, so as to space the main body of the side member 16 from the side member 15 to form a longitudinal slot or opening 19. The side member 14 forms a guide for a brake lever 18 of well known construction. The side member 16 is stamped to form a transversely extending recess 20 and the metal at one of the transverse edges of this recess is bent downwardly as shown at 21, and rearwardly so as to form a stop 21ª. The opening or slot 19 thus extends longitudinally and has a portion on opposite sides of the bent part 21, and in effect forms two openings one on each of the opposite sides of said bent part. The side member 15 is provided with a rearwardly facing shallow stop shoulder 22 and the side member 16 is provided with a forwardly facing shallow stop shoulder 24.

A controlling lever 23 is mounted to swing transversely on a pivot 23ª on a shaft 25, which extends across the vehicle and is connected to the gear shifting rod, and a downwardly extending arm of this lever is connected to a bell crank lever 26 which is pivoted on a bracket 26ª secured to one of the side members, and this bell crank lever is connected to the reverse gearing. The connections from the shaft 25 and the bell crank lever 26 to the gear shifting mechanisms are fully shown and described in the patent of Huff referred to. By means of the above construction, the controlling lever is arranged to move longitudinally of the guide for changes in speed forward, and transversely of the same into the recess 20 for reversing.

The controlling lever has formed thereon beads 27 which form guides for a sliding member 28 which embraces the beads 27. This sliding member is provided with a slot 29 which is arranged to engage a stop 30 on the lever so as to limit the movements of the sliding member. A headed screw 31 is threaded into the sliding member 28 and is provided with a lock washer 32 and with a socket 33, which is arranged to receive a transversely projecting lug or pin 34 on a sliding rod 35, which slides in a channel formed in the lever. The upper end of the lever is provided with a tubular handle 36 which is inclined forwardly as shown in Fig. 7. A button 37 is formed on the rod 35 and projects from the handle and this button forms a stop shoulder 38 for one end of a spring 39, which is mounted on the rod within the handle and bears at its other end against a shoulder 40 in the lever. The sliding member 28 is preferably of sheet metal and is provided with a rearwardly extending latch lug 41 which is arranged to engage the stop 21<sup>a</sup>.

The controlling lever as has been described is arranged to move along and transversely of the guide. The positions of this lever are shown in Fig. 3, the lever being shown in full lines in neutral position $a$. The first or low speed position is indicated by $b$; the intermediate or second speed by $c$; the high or third speed position by $d$; and the reverse position by $e$. The shallow stop shoulders 22 and 24 are provided in order to arrest the controlling lever in intermediate position. By forming these shoulders shallow the guide slot 19 is practically continuous while at the same time it is insured that the lever will be arrested in intermediate position, in view of the fact that when the lever is moved forwardly there is a tendency to press it outwardly against the side member 15, while when this lever is moved rearwardly there is a tendency to press it against the side member 16.

It will be seen that when the lever is in neutral position, it is directly opposite the reverse recess 20. It is therefore desirable to lock this lever against inadvertent movement to reverse position. This is accomplished by the latching means controlled by the button 37 on the lever. When the lever is in neutral position shown in Figs. 1, 2 and 3, the spring 39 will maintain the slide 28 and its latch lug 41 raised so that this latch lug 41 will engage the stop shoulder 21<sup>a</sup>, thereby normally preventing transverse movement of the lever. If, however, the button 37 on the latch release rod 35 be depressed the latch lug 41 will move below the lower face of the shoulder 21<sup>a</sup>, thus permitting transverse movement of the lever to reverse position. If however, the lever after it has been moved to reverse position is again moved to neutral position, the latch lug 41 which has been held in yielding engagement with the lower face of 21<sup>a</sup> will snap over the shoulder and will therefore automatically lock the lever against movement into the reverse position again.

The latch release rod 35 must of course be bent so as to conform to the shape of the lever and its handle. It will however be seen from Figs. 8 and 9 that the lever is so constructed that this release rod can be removed by an endwise movement. The sliding member 28 is placed on and removed from the lever by an endwise movement and is retained thereon, after it is in place, by means of the pin and slot connection 29, 30. The release rod 35 is retained in position with the pin 34 engaging socket 33 by means of the threaded screw construction 31 which permits a disengagement of the socket from the pin but locks the rod in position as shown in Fig. 5.

The side member 16 is formed of a single stamping thereby cheapening the construction considerably, and the number of parts is reduced by utilizing the portion 16<sup>b</sup> on the side member 16, and the arms 12 and 13 as separators or spacing blocks for the side members.

It is obvious that various changes may be made in the details of construction without departing from this invention, and it is therefore to be understood that this invention is not to be limited to the specific construction shown and described.

Having thus described the invention, what is claimed is:

1. In controlling mechanism for motor vehicles, the combination with a guide, of a controlling lever mounted for movement along and transversely of said guide, a latch sliding on and embracing said lever, a rod in said lever having a transverse pin thereon, and an adjustable screw on said latch provided with a socket engaging said pin.

2. A controlling lever having a body of channel cross section, a tubular handle thereon arranged at an angle to said body, and a release rod mounted in the channel of the lever, extending through the handle, and bent to conform to the lever body and handle, said parts being constructed to permit endwise removal of said rod from said lever.

3. A controlling lever having a body of channel cross section, a tubular handle thereon arranged at an angle to said body, a release rod mounted in the channel of the lever, extending through the handle and bent to conform to the lever body and handle, a button on the handle end of said rod, and a spring on said rod, said parts being constructed to permit endwise removal of said rod from said lever.

4. In controlling mechanism for motor vehicles, a guide including a stamped metal side member having a transverse recess formed therein, the metal at the recess being bent at right angles to said guide, and longitudinal openings at the opposite sides of said bent portion.

5. In controlling mechanism for motor vehicles, a guide including a stamped metal side member having a transverse recess formed therein, the metal at the recess being bent down to form a shoulder, and longitudinal openings at the opposite sides of said shoulder.

6. In controlling mechanism for motor vehicles, a guide including a stamped metal side member having a transverse recess formed therein, the metal at one of the transverse edges of the recess being bent to form a stop shoulder, and longitudinal openings at the opposite sides of said shoulder.

7. In controlling mechanism for motor vehicles, a guide including a stamped metal side member having a transverse recess formed therein, the metal at the recess being bent back to form a stop shoulder, and longitudinal openings at the opposite sides of said shoulder.

8. In controlling mechanism for motor vehicles, a guide including a stamped metal side member having a transverse recess and spaced longitudinal recesses formed therein, the metal at one of the transverse edges of the transverse recess being bent to form a stop shoulder, and the ends being bent to form eyes.

9. In controlling mechanism for motor vehicles, the combination with a guide including a stamped metal guide member having a transverse recess and spaced longitudinal recesses formed therein, the metal at the recess being bent to form a stop shoulder arranged between said longitudinal recesses, of a controlling lever mounted to move longitudinally and transversely of said guide, and a latch on said lever adapted to engage said shoulder.

10. In controlling mechanism for motor vehicles, the combination with a guide including a stamped metal guide member having a transverse recess and spaced longitudinal recesses formed therein, the metal at the recess being bent downwardly to form a stop shoulder below said guide member and between said longitudinal recesses, of a controlling lever mounted to move longitudinally and transversely of said guide, and a latch on said lever adapted to engage said shoulder.

11. In controlling mechanism for motor vehicles, the combination with a guide including a guide member formed of stamped metal and having a transverse recess and spaced longitudinal recesses therein, the metal displaced to form the recess forming a shoulder below the guide and between said longitudinal recesses, of a control lever mounted to move longitudinally of the guide and in the transverse recess, and a latch on said lever coöperating with said shoulder to prevent the movement of the lever in the recess when the latch is in normal position.

12. In controlling mechanism for motor vehicles, the combination of a guide, a lever mounted to move along the guide and transversely thereof, a latch slidably mounted on the lever and having a slot and a socket, a stop on the lever coöperating with said slot to limit the sliding movement of the latch in both directions, a spring-pressed rod mounted in the handle of the lever and having a transverse pin at its lower end adapted to enter the socket in the latch, and means for retaining said pin therein.

13. The combination with a controlling lever, of a latch having a limited sliding movement thereon, a rod adapted to operate the latch, and means mounted on the latch and securing the rod between said means and a part of the lever whereby said rod is retained in operating connection with the latch.

14. In controlling mechanism for motor vehicles, the combination with a lever having a slideway, of a latch adapted to work on said slideway and be removed endwise therefrom, a removable stop on said lever adapted to limit the endwise movement of said latch in both directions, and a rod for operating said latch.

In testimony whereof I affix my signature in presence of two witnesses.

ALLEN LOOMIS.

Witnesses:
J. B. BOYCE,
C. I. DALE.